United States Patent

Brun et al.

[11] Patent Number: 6,032,532
[45] Date of Patent: Mar. 7, 2000

[54] SENSOR, IN PARTICULAR ACCELEROMETER, AND ACTUATOR WITH ELECTRIC INSULATION LOCALISED IN A SUBSTRATE PLATE

[75] Inventors: Jean Brun, Champagines; Jean-Sébastien Danel, Grenoble, both of France

[73] Assignee: Commissariat A l'Energie Atomique, Paris, France

[21] Appl. No.: 09/077,301

[22] PCT Filed: Oct. 1, 1997

[86] PCT No.: PCT/FR97/01733

§ 371 Date: Jul. 1, 1998

§ 102(e) Date: Jul. 1, 1998

[87] PCT Pub. No.: WO98/14786

PCT Pub. Date: Apr. 9, 1998

[30] Foreign Application Priority Data

Oct. 3, 1996 [FR] France .................................. 96 12062

[51] Int. Cl.[7] .................................................. G01P 15/125
[52] U.S. Cl. ..................... 73/514.32; 73/514.38; 360/280
[58] Field of Search ............................ 73/514.32, 514.36, 73/514.38; 257/415; 361/280, 283.1; 438/50, 52

[56] References Cited

U.S. PATENT DOCUMENTS

| | | |
|---|---|---|
| 4,653,326 | 3/1987 | Danel et al. . |
| 5,286,944 | 2/1994 | Li . |
| 5,364,497 | 11/1994 | Chau et al. . |
| 5,408,119 | 4/1995 | Greiff . |
| 5,569,852 | 10/1996 | Marek et al. ..................... 73/514.32 |
| 5,576,250 | 11/1996 | Diem et al. . |
| 5,627,317 | 5/1997 | Offenberg et al. .................. 73/514.32 |

FOREIGN PATENT DOCUMENTS

| | | |
|---|---|---|
| 0 557 219 A1 | 8/1993 | European Pat. Off. . |
| 2 558 263 | 7/1985 | France . |
| 2 700 065 | 7/1994 | France . |

OTHER PUBLICATIONS

V. P. Jaecklin, et al., *Sensors and Actuators A*, vol. 39, pp. 83 to 88, "Comb Actuators for XY–Microstages", 1993.

K. Tanaka, et al., Yokohama Research and Development Center, Murata Manufacturing Co. Ltd, pp. 278 to 281, "A Micromachined Vibrating Gyroscope", 1995.

*Primary Examiner*—John E. Chapman
*Attorney, Agent, or Firm*—Oblon, Spivak, McClelland, Maier & Neustadt, P.C.

[57] ABSTRACT

A sensor or actuator structure having a first part and at least one second part. The second part is mobile and electrically insulated in relation to the first part. The first and second parts are formed in a noninsulating substrate wafer and have mutually adjacent edges separated by at least one cut which goes right through the substrate. The second part has at least one extension in the form of a beam which has one end fixed onto the first part by way of an electrically insulating joint. This device may be used in an accelerometer.

19 Claims, 3 Drawing Sheets

SENSOR, IN PARTICULAR ACCELEROMETER, AND ACTUATOR WITH ELECTRIC INSULATION LOCALISED IN A SUBSTRATE PLATE

BACKGROUND OF THE INVENTION

1. Field of the Invention

The invention relates to a sensor or actuator structure and a method of manufacturing a sensor or actuator structure with localised electrical insulation in a substrate wafer. The invention relates, in particular, to an accelerometer structure and its method of manufacture. By accelerometer, one understands an acceleration sensor comprising, for the main part, a mobile element of mass m and means of measuring the force $F=m\gamma$ exerted on the mobile element and due to the acceleration $\gamma$ of a body in motion on which the accelerometer is mounted.

Today, acceleration is a parameter which has become more and more useful and necessary to know for industrial requirements, notably in the space and aeronautical fields, and also for applications for the public at large such as automobile applications for the control of active suspension or of air bags.

The development of these latter applications necessitates a very large reduction in manufacturing costs while at the same time maintaining acceptable metrological properties of the sensors.

In a general way, the accelerometers of the invention can be used in all fields where one wishes to measure the acceleration of a body in motion.

The invention also relates to structures of sensors such as gyrometers or pressure sensors, as well as actuators.

2. Discussion of the Background

A first known type of accelerometer is described, for example, in FR-A-2 700 065 (thereafter "Document (1)").

Document (1) refers to an accelerometer manufactured on a Silicon On Insulator type substrate. Such a substrate comprises a surface layer of silicon and a support layer, also made of silicon and separated from the surface layer by a layer of silicon oxide called an embedded insulating layer.

The mobile elements of the accelerometer, in the same way as the measurement means are etched directly in the surface layer which is kept integral with the support layer by means of the embedded insulating layer. The embedded insulating layer also provides electrical insulation between the different parts of the accelerometer.

A second known type of accelerometer is described, for example, in FR-A-2 558 263 (therafter "Document (2)").

The accelerometer type conforming to the information disclosed in document (2) is produced by micro-lithography, directly into a massive substrate. The elements of the accelerometer, and in particular its mobile seismic mass, are defined by etching of the substrate using a suitable mask.

The different parts of the substrate are fitted with metal electrodes forming capacitive means of measuring the displacement of the seismic mass in motion. The electrical insulation of the electrodes is provided by the substrate itself which is for example, made of quartz.

The accelerometers described above are of complex construction, either because of the use of a multi-layer substrate of the Silicon On Insulator type, or because of the need to provide conducting electrodes capable of forming the measurement means, on various parts of the accelerometer.

The complexity of the construction constitutes an obstacle to the miniaturisation of the devices, to the provision of high production efficiency and to the cost reduction of the accelerometers obtained.

SUMMARY OF THE INVENTION

The aim of this invention is to provide a sensor structure, notably an accelerometer structure, or an actuator structure directly formed in a wafer of conductor or semi-conductor material, which does not have the limitations described above.

Another aim of the invention is to provide a method of producing a sensor structure, notably an accelerometer structure, or an actuator structure which is both reliable and economic.

In order to achieve these aims, the object of the invention is more precisely a sensor structure, notably an accelerometer structure, or an actuator structure that comprises a first part and at least one second part, the second part being mobile in relation to the first part and electrically insulated from the first part, the first and second parts being formed in a non-insulating substrate wafer, having mutually adjacent edges separated by at least one cut going right through the substrate, and the second part having at least one extension in the form of a beam, characterised in that the extension in the form of a beam has one end fixed onto the first part by means of an electrically insulating joint arranged in the cut that goes right through the substrate.

Furthermore, by sensor structure, notably accelerometer structure or actuator structure one understands a structure comprising the fixed and mobile parts of sensors or of actuators. For example, in the case of an accelerometer, this means a fixed frame and a seismic mass that is movable in relation to the frame. The fixed and movable parts can each be fitted with means that co-operate in order to detect the relative movement of these parts. These detection means can comprise, for example, the plates of a capacitor variable with the displacement of the seismic mass.

The structure can be fitted with a plurality of second parts forming as many seismic masses for the detection of an acceleration along different directions in space, for example. Similarly, each second part can be suspended by a single extension forming a beam or by a plurality of such extensions.

This technique can be applied to the production of actuators or gyrometers manufactured within the thickness of the massive substrate but up to the present time provided by surface technologies. Reference can be made to this subject in "Comb Actuators for xy-microstages" by V. P. Jaecklin et al, Sensors and Actuators A, 39 (1993) 83–89 and in "A micro-machined vibrating gyroscope" by K. Tanaka et al. The various parts of the structure, subjected to various different potentials are insulated from one another.

For reasons of simplification, the description which follows only relates to the particular case where the structure only comprises one second part and where this is suspended by several extensions in the form of a beam.

Furthermore, the extensions of the second part, in the form of beams, are more simply given the name "beams".

Thanks to the beams, the second part of the structure is not held in a rigid fashion in relation to the first part but is suspended in an elastic fashion.

According to one important aspect of the invention, the substrate wafer, and consequently the first and second parts of the structure are made of a non-insulating material, that is to say a conductor or semi-conductor material. Hence, the first and second parts directly form the plates of a capacitor, the capacity of which varies as a function of the movements of the mobile part, in this case the second part which then forms a seismic mass.

By way of example, the substrate wafer can be made of a material chosen from among the following semi-conductor materials Si, SiC, AsGa the following metals Au, Ti, W, Cr, Al, Fe, Ni, Mo and alloys of these metals.

According to one advantageous aspect of the invention, that allows the production of an accelerometer sensitive to an acceleration in one particular direction, at least one edge of each of the first and second parts can be in the shape of a comb, the comb-shaped edges of the first and second parts being respectively interdigitated.

It is considered that the comb-shaped edges are interdigitated when the teeth of the comb of each part respectively occupy an interdigital position between the teeth of the part that is facing it.

An object of the invention is also an accelerometer comprising an accelerometer armature with a first and at least one second part made of an electrically non-insulating material, insulated and movable in relation to one another, to form a capacitor with a variable capacity, and a measurement system that allows variations of the capacity of said capacitor to be determined.

According to the invention, the plate conforms to the plate described above.

This aspect of the invention permits the production of reliable, sensitive accelerometers at low cost.

Finally, an object of the invention is a method of producing an accelerometer armature such as that described above, that comprises a first and a second part, electrically insulated one from the other, and formed in a non-insulating substrate wafer, the second part being movable in relation to the first part and having at least one extension in the form of a beam fixed onto the first part. The method comprises the following successive steps:

a) cutting in the substrate wafer a void in each region corresponding to a free end of an extension of the second part before it is formed in the substrate wafer, b) placing an electrically insulating material in each void, c) etching into the wafer at least one cut separating the first and second parts and defining their adjacent edges, the insulating material in the voids being preserved during this etching in order to form an insulating joint which links the end of each extension of the second part to the first part.

According to a first way of implementing the method, at step a) the voids are cut right through the wafer, that is to say the voids extend through the entire thickness of the wafer.

According to a variant, at step a) of the method, voids are cut that do not go right through the wafer leaving a "wafer bottom" in each void. The wafer bottom has, for example, a thickness of 300 µm for a void on a thickness of 500 µm.

In this case, the method comprises, in addition, after the placing of the electrically insulating material in the voids, the thinning down of the substrate wafer in order to remove the wafer bottom in each void.

The electrically insulating material arranged in the voids constitutes a joint linked to the first and second parts over a portion of their cut and extends through the entire thickness of the wafer. After the thinning down of the wafer, the joint is flush with the two main faces of the wafer.

Other characteristics and advantages of the invention will more clearly emerge from the description which will follow, making reference to the appended drawings and which is given for purely illustrative purposes and which is non-limitative.

DESCRIPTION OF THE PREFERRED EMBODIMENTS

Figure 1:
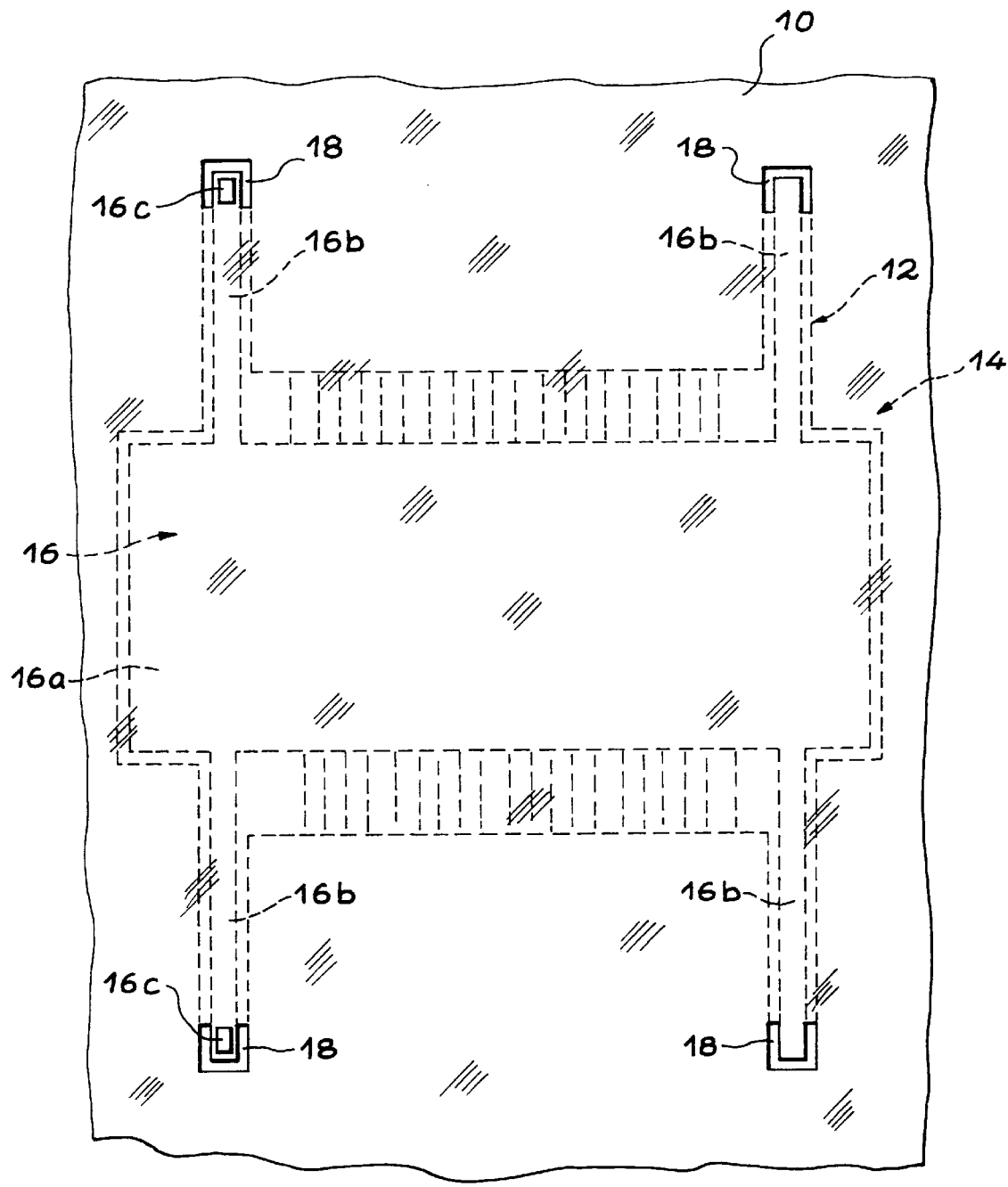
FIG. 1 is a view from above of a wafer of conductor or semi-conductor material in which voids have been made.

As FIG. 1 shows, one starts with a substrate wafer 10 made of a conductor or semi-conductor material. The wafer 10 can be preferably a massive substrate wafer or a wafer constituted by a stack of several layers.

In this case, the wafer is considered to be made of a non-insulating material when at least one of the layers that make it up is made of a material that has this property. The broken lines 12 show, for illustrative purposes the limits of a first part 14 and of a second part 16 of an accelerometer armature that one wishes to form in the wafer 10.

The second part 16, which is still not defined in the wafer, comprises, as the broken lines 12 show, a central area 16a and four extensions 16b which are destined to be formed as suspension beams for the central area 16a.

In a complementary fashion, the substrate wafer 10 can be previously prepared to later facilitate making contact, notably onto the second insulated part 16. To this end, it is possible to carry out an implant of ions into one (or more) specified area(s) in order to increase the conductivity of it (them). These areas are marked in FIG. 1 with reference number 16c and are named "contact area". It is also possible to choose a wafer 10 made of a relatively conductive material such as a silicon wafer of resistivity of the order of $10^{-2}$ Ω.cm, for example.

Then, in the contact areas, using known photo-masking and etching techniques, a deposition of tungsten of thickness 200 nm is carried out, for example, in order to provide electrical conduction with the silicon of the wafer 10. This deposition is followed by a deposition of gold of thickness 500 nm, for example, to allow the soldering of a contact wire.

One may note that the depositions of tungsten and gold can be restricted to localised areas such as the areas 16c marked in FIG. 1, but can also cover the whole of part 16, including the extensions 16b. In this case, however, it is advisable to take care that the metal depositions do not cause a short circuit between the first and second parts 14, 16.

In a first step of a method, one etches voids 18 in the wafer 10, located on the wafer in areas surrounding the ends of the beams 16b that will be etched later.

In the example illustrated, the voids have a U-shape appropriate to the width of the beams 16b whose ends they surround. The width of the void corresponds approximately to the width of the cuts that will later be made in the wafer to separate the first and second parts.

In the example described, the voids 18 go right through the wafer. They are made in the wafer using a dry or wet etching method or an ultrasound or laser micro-machining process.

Present day anisotropic deep etching equipment makes it possible to etch deep voids or cuts into substrates. For example, it is possible to etch openings or cuts right through a silicon wafer with a thickness of the order of 500 μm or more.

Figure 2:
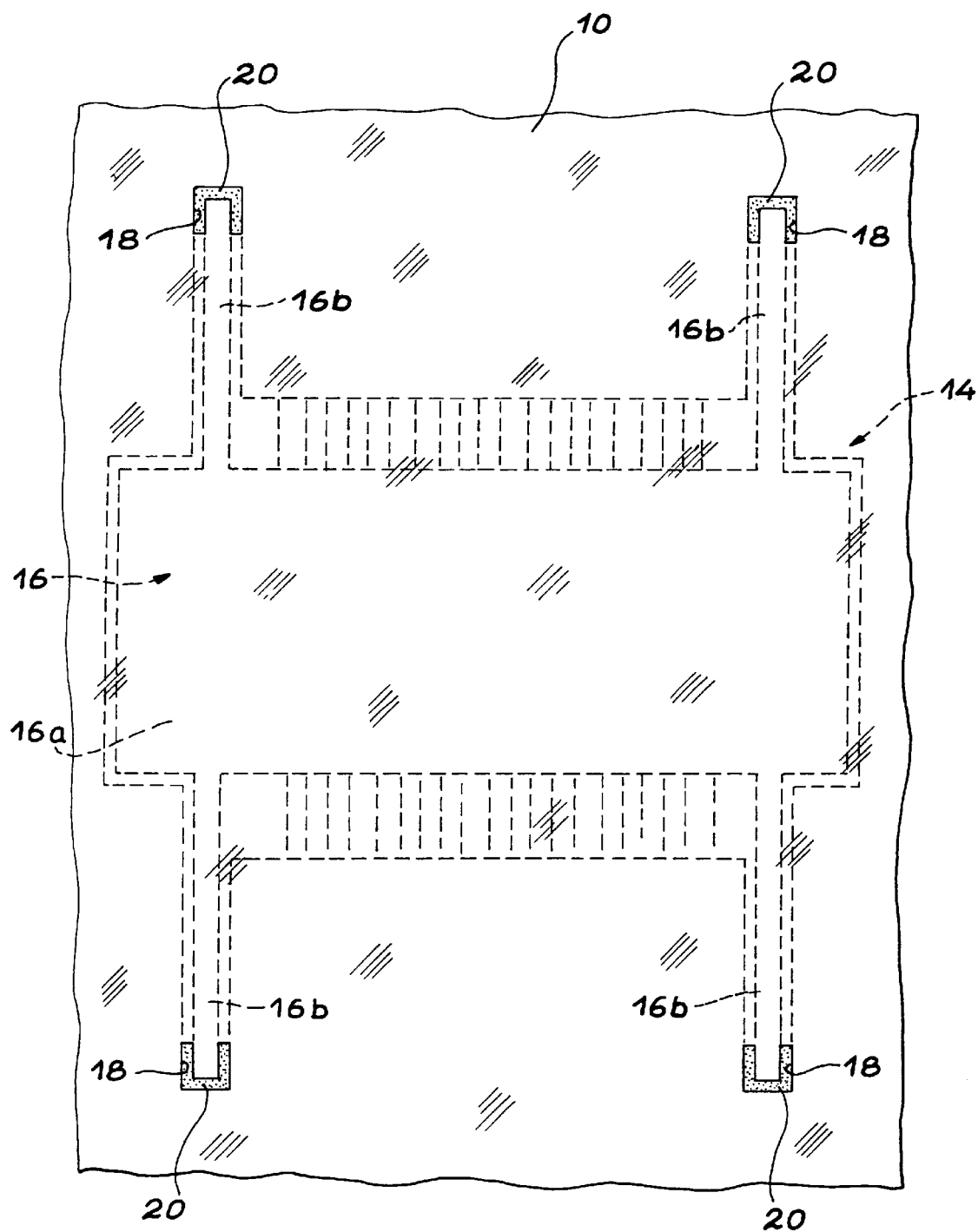
FIG. 2 is a view from above of the wafer in FIG. 1, in which the voids have been filled with an electrically insulating material.

A following step of the method is illustrated in FIG. 2.

It corresponds to the placing of an electrically insulating material 20 in the voids.

A material is considered to be electrically insulating when it has an electrical conductivity which is substantially negligible in comparison with the electrical conductivity of the wafer material 10.

Furthermore, it is considered that the voids 18, even if they are later filled in with the insulating material 20, form part of the cuts separating the first and second parts in the same way as cuts made later which are described below.

The placing of the insulating material in the cuts can comprise, for example, the deposition of a drop of insulating adhesive in the center of the wafer 10, the positioning of a silicone foam film on the face of the wafer that includes the drop, and then putting the assembly under a press in order to force the adhesive into the voids 18. The adhesive is, for example, an adhesive of the Epotechni brand, type E505.

The adhesive can be replaced by any polymer or liquid epoxy resin for example, which is capable of being polymerised or dried after its introduction into the voids 18. The chosen polymer or the resin must however be electrically insulating.

According to a variant, the insulating material in the voids 18 can be formed by deposition or by crystal growth. This relates, for example to a layer of silicon or silicon nitride.

In FIG. 2, the insulating material is flush with the surface of the wafer 10. Hence the joint is only in contact with the first and second parts on their edges facing the end of each beam. However the layer of insulating material formed in the voids can also extend, in certain cases, at least in part, over the main faces of the wafer 10.

Figure 3:
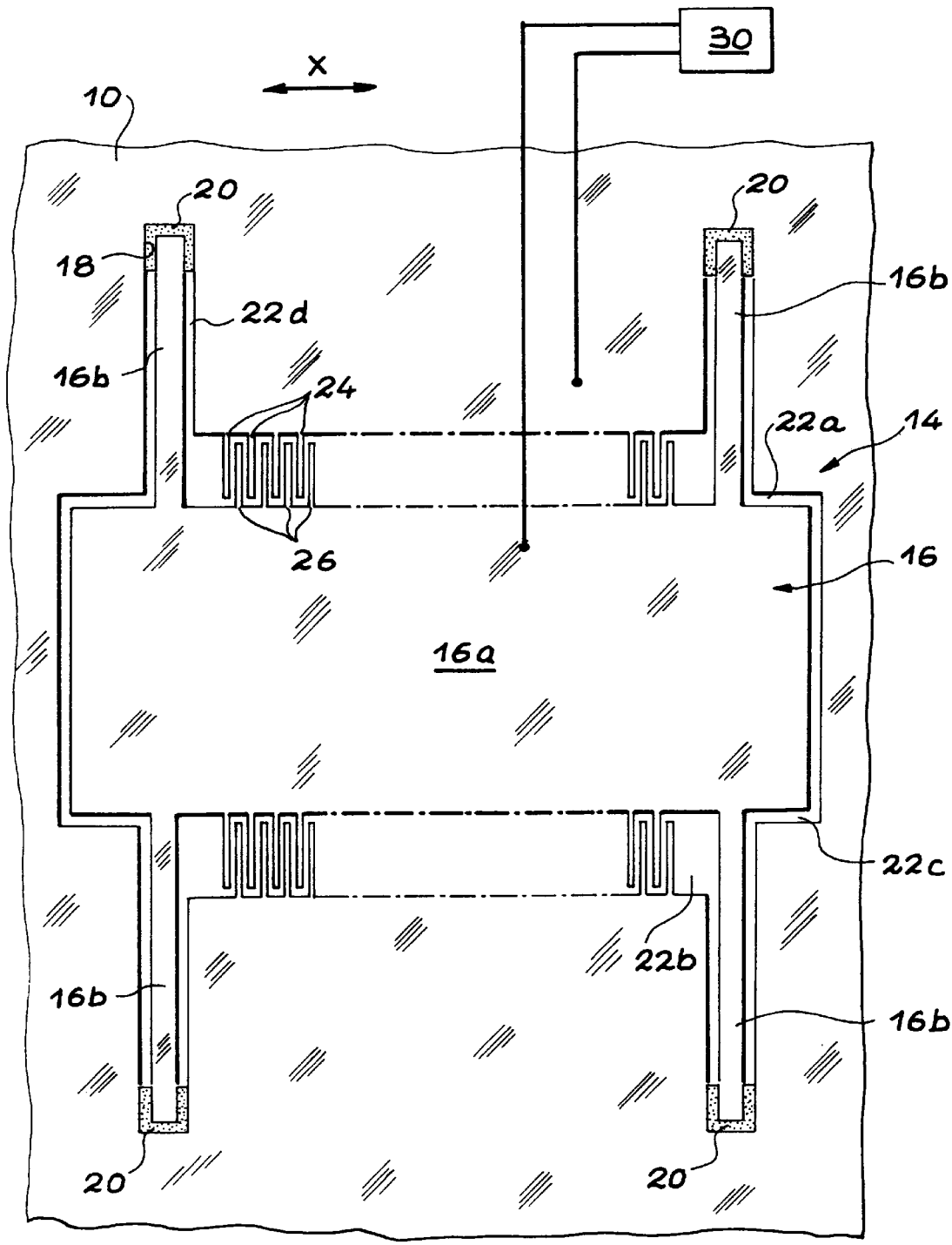
FIG. 3 is a view from above of the wafer in FIG. 1, in which cuts separating the first and second parts of an accelerometer armature have been made.

A following step of the method is illustrated in FIG. 3. This step corresponds to the etching of the cuts 22a, 22b, 22c and 22d. During this etching, carried out in accordance with one of the methods described above, the insulating material joints 20 remain intact.

Except for these joints, the cuts completely separate the first and second parts 14, 16 which are then electrically insulated from one another.

As shown in FIG. 3, the adjacent edges of the first and second parts have respectively a comb shape with the teeth 24 and 26 interdigitated.

The parts 14 and 16 and more particularly the teeth 24 and 26 form respectively the plates of a capacitor.

A movement of the part 16 along the direction X, indicated in FIG. 3 by an arrow parallel to the wafer 10, is capable of causing a change in the capacity of the capacitor.

Hence, an accelerometer is formed by respectively linking the parts 14 and 16 to a measurement system 30, represented in a very diagrammatic way in FIG. 3. The measurement system comprises, for example, a capacitance meter and a calculation unit to convert a change in measured capacity into a value of the acceleration to which the accelerometer was subjected.

With regard to this subject, reference may be made to document (2) mentioned at the end of this description.

Documents Quoted (1)
FR-A-2 700 065
(2)
FR-A-2 558 263
(3)
Comb actuators for xy-microstages by V. P. Jaecklin et al. Sensors and Actuators A, 39 (1993) 83–89
(4)
A micro-machined vibrating gyroscope by K. Tanaka et al.
Yokohama Research and Development Center, Murata Manufacturing Co. Ltd. 1-18-1 Akusan, Midori-ku, Yokohama, 226, Japan, IEE 1995, pp. 278–281.

We claim:

1. An acceleration sensor comprising:
a non-insulating substrate;
a first part formed in said substrate; and
at least one second part formed in said substrate, mobile in relation to the first part and electrically insulated from the first part, said at least second part having at least one extension in the form of a beam,
wherein the first and second parts have mutually adjacent edges separated by at least one cut going through an entire thickness of the substrate,
said at least one extension in the form of a beam has one end fixed onto the first part through an electrically insulating joint arranged in the at least one cut, said joint extending through the entire thickness of the substrate, and contacting said first and second parts by contacting only portions of said mutually adjacent edges of said first and second parts, and
said second part is supported only by said electrically insulating joint.

2. The sensor according to claim 1, wherein said portions of said mutually adjacent edges contacting said electrically insulating joint are located at an end of said at least one extension in the form of a beam.

3. The sensor according to claim 1, wherein the substrate comprises a material selected form the group consisting of Si, SiC, AsGa, Au, Ti, W, Cr, Al, Fe, Ni, Mo, an Au alloy, a Ti alloy, a W alloy, a Cr alloy, an Al alloy, an Fe alloy, a Ni alloy, and a Mo alloy.

4. The sensor according to claim 1, wherein at least one edge of each of the first and second parts has a shape of a comb, the edges in the shape of a comb of the first and second parts being respectively interdigitated.

5. The sensor according to claim 1, further comprising a system of measurement configured to measure variations in capacity between said first and second parts.

6. The sensor according to claim 2, wherein at least one edge of each of the first and second parts has a shape of a comb, the edges in the shape of a comb of the first and second parts being respectively interdigitated.

7. The sensor according to claim 3, wherein at least one edge of each of the first and second parts has a shape of a comb, the edges in the shape of a comb of the first and second parts being respectively interdigitated.

8. The sensor according to claim 2, further comprising a system of measurement configured to measure variations in capacity between said first and second parts.

9. The sensor according to claim 3, further comprising a system of measurement configured to measure variations in capacity between said first and second parts.

10. The sensor according to claim 4, further comprising a system of measurement configured to measure variations in capacity between said first and second parts.

11. An actuator comprising:

a non-insulating substrate;

a first part formed in said substrate; and at least one second part formed in said substrate, mobile in relation to the first part and electrically insulated from the first part, said at least second part having at least one extension in the form of a beam, wherein the first and second parts have mutually adjacent edges separated by at least one cut going through an entire thickness of the substrate, said at least one extension in the form of a beam has one end fixed onto the first part through an electrically insulating joint arranged in the at least one cut, said joint extending through the entire thickness of the substrate, and contacting said first and second parts by contacting only portions of said mutually adjacent edges of said first and second parts, and said second part is supported only by said electrically insulating joint.

12. The actuator according to claim 11, wherein said portions of said mutually adjacent edges contacting said electrically insulating joint are located at an end of said at least one extension in the form of a beam.

13. The actuator according to claim 11, wherein the substrate comprises a material selected form the group consisting of Si, SiC, AsGa, Au, Ti, W, Cr, Al, Fe, Ni, Mo, an Au alloy, a Ti alloy, a W alloy, a Cr alloy, an Al alloy, an Fe alloy, a Ni alloy, and a Mo alloy.

14. The actuator according to claim 11, wherein at least one edge of each of the first and second parts has a shape of a comb, the edges in the shape of a comb of the first and second parts being respectively interdigitated.

15. The actuator according to claim 12, wherein at least one edge of each of the first and second parts has a shape of a comb, the edges in the shape of a comb of the first and second parts being respectively interdigitated.

16. The actuator according to claim 13, wherein at least one edge of each of the first and second parts has a shape of a comb, the edges in the shape of a comb of the first and second parts being respectively interdigitated.

17. The actuator according to claim 11, further comprising a system of measurement configured to measure variations in capacity between said first and second parts.

18. The actuator according to claim 12, further comprising a system of measurement configured to measure variations in capacity between said first and second parts.

19. The actuator according to claim 13, further comprising a system of measurement configured to measure variations in capacity between said first and second parts.

* * * * *